(12) United States Patent
Xie

(10) Patent No.: US 7,401,917 B2
(45) Date of Patent: Jul. 22, 2008

(54) DETACHABLE SHELTER FRAME FOR SPECTACLES

(76) Inventor: Yiling Xie, 900 Arcadia Ave., #8, Arcadia, CA (US) 91007

( * ) Notice: Subject to any disclaimer, the term of this patent is extended or adjusted under 35 U.S.C. 154(b) by 0 days.

(21) Appl. No.: 11/646,906

(22) Filed: Dec. 27, 2006

(65) Prior Publication Data

US 2007/0103637 A1    May 10, 2007

Related U.S. Application Data

(60) Division of application No. 11/109,234, filed on Apr. 18, 2005, now Pat. No. 7,249,841, which is a continuation-in-part of application No. 10/934,020, filed on Sep. 2, 2004, now Pat. No. 7,152,974.

(51) Int. Cl.
*G02C 7/08* (2006.01)
(52) U.S. Cl. ............................... 351/57; 351/47
(58) Field of Classification Search ............ 351/47, 351/48, 57, 58
See application file for complete search history.

(56) References Cited

U.S. PATENT DOCUMENTS 4,247,178 A * 1/1981 Cook .......................... 351/47
5,696,571 A * 12/1997 Spencer et al. ............... 351/47

\* cited by examiner

*Primary Examiner*—Huy K Mia
(74) *Attorney, Agent, or Firm*—Raymond Y. Chan; David and Raymond Patent Firm

(57) ABSTRACT

A spectacle set includes a primary spectacle and a detachable shelter frame. The primary spectacle includes two lenses, a primary bridge extended between two inner sides of the lenses respectively. The detachable shelter frame includes two shelter lenses, a shelter bridge extended between two inner sides of the shelter lenses, and a mounting arrangement comprising first through third supporting members spacedly and rearwardly extended from the shelter bridge to engage on the primary bridge so as to support the shelter lenses aligning with the lenses respectively, and a retention member rearwardly extending to apply an urging force against the primary bridge to engage with the primary bridge when the detachable shelter frame is mounted in front of the primary spectacle so as to substantially retain the detachable shelter frame in a balance manner.

12 Claims, 19 Drawing Sheets

DETACHABLE SHELTER FRAME FOR SPECTACLES

CROSS REFERENCE OF RELATED APPLICATION

This application is divisional application of a regular application, having an application Ser. No. 11/109,234 and a filing data of Apr. 18, 2005, now U.S. Pat. No. 7,249,841, which is a continuation-in-part of a regular application having an application Ser. No. 10/934,020 and a filing date of Sep. 2, 2004, now U.S. Pat. No. 7,152,974.

BACKGROUND OF THE PRESENT INVENTION

1. Field of Invention

The present invention relates to a spectacle set, and more particularly to a spectacle set, wherein a mounting arrangement of a detachable shelter frame is arranged to apply an urging force to securely mount the detachable shelter frame in front of a primary spectacle in a detachably attaching manner so as to enhance the mounting operation of the detachable shelter frame.

2. Description of Related Arts

Shelter frames are widely used today. A conventional shelter frame such as clip-on sunglasses comprises a plurality of clipping claws for detachably mounting on shortsighted or farsighted sunglasses so that the wearer does not need to carry and pay for another pair of shortsighted or farsighted sunglasses. However, the metal made clipping claws may scratch the lenses of the primary eyeglasses during the mounting process. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problems of the above mentioned clip-on sunglasses, magnetic attachment is recently introduced into the eyeglasses industry. A primary pair of magnet members is affixed on two upper side extensions of a primary spectacle frame respectively. An shelter frame such as a sunglasses includes a pair of arms for resting over the upper side extensions for preventing the shelter frame from moving downward relative to the primary spectacle frame and an auxiliary pair of magnet members connected to the arms respectively for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Thus, the major drawback of the eyeglasses equipped with the magnet attachment is that the primary spectacle frame needs to be altered its original structural design in order to affix the magnet members thereon. So, the wearer may have to buy a pair of spectacle frames including a primary eyeglasses and an auxiliary sunglasses, which is much expensive than that the wearer needs to buy the clip-on sunglasses only. Moreover, a pair of primary magnet members is always located in front of the user's eyes.

SUMMARY OF THE PRESENT INVENTION

A main object of the present invention is to provide a spectacle set, wherein a mounting arrangement of a detachable shelter frame is arranged to apply an urging force to securely mount the detachable shelter frame in front of a primary spectacle in a detachably attaching manner so as to enhance the mounting operation of the detachable shelter frame.

Another object of the present invention is to provide a spectacle set, wherein the mounting arrangement comprises a supporting arm extended to a primary bridge of the primary spectacle to support a weight of the detachable shelter frame by the primary bridge and a retention member arranged to apply the urging force against the primary bridge to retain the detachable shelter frame in position. Therefore, the detachable shelter frame can be substantially mounted in front of the primary spectacle.

Another object of the present invention is to provide a spectacle set, wherein the retention member has an engaging tip substantially engaged with the primary bridge to hold the detachable shelter frame in position so as to prevent up and down or sideward movement of the detachable shelter frame with respect to the primary spectacle.

Another object of the present invention is to provide a spectacle set, wherein the wearer may merely use one hand to attach or detach the detachable shelter frame during exercising or driving without distorting the structure of the primary spectacle.

Another object of the present invention is to provide a spectacle set, wherein the detachable shelter frame is adapted to incorporate with any kind of primary spectacle having a primary bridge extended between two lenses, such that the primary spectacle does not require to alter its original structural design to fit the detachable shelter frame so as to minimize the cost of the spectacle set.

Another object of the present invention is to provide a spectacle set, wherein no expensive or complicated mechanical structure is required to employ in the present invention in order to achieve the above mentioned objects. Therefore, the present invention successfully provides an economic and efficient solution not only for providing the supporting arm to securely support the detachable spectacle frame in front of the primary spectacle but also for retaining the detachable shelter frame in front of the primary spectacle through the retention member.

Another object of the present invention is to provide a spectacle set, wherein the detachable shelter frame is supported on a primary bridge of the primary spectacle frame at three discrete points thereof so as to ensure maximum balance of the detachable shelter frame.

Accordingly, in order to accomplish the above objects, the present invention provides a spectacle set comprising a primary spectacle and a detachable shelter frame detachably mounting in front of the primary spectacle.

The primary spectacle comprises two lenses, a primary bridge extended from two inner sides of the lenses respectively, and two side extensions provided at two outer sides of the lenses for coupling a pair of temples respectively.

The detachable shelter frame comprises two shelter lenses, a shelter bridge extended between two inner sides of the shelter lenses, and a mounting arrangement comprising at least three supporting members rearwardly extended from the shelter bridge to engage with the primary bridge so as to support the shelter lenses aligning with the lenses respectively and a retention member rearwardly extending to apply an urging force against the primary bridge to engage with a rear side of the primary bridge when the detachable shelter frame is mounted in front of the primary spectacle so as to substantially retain the detachable shelter frame in position.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
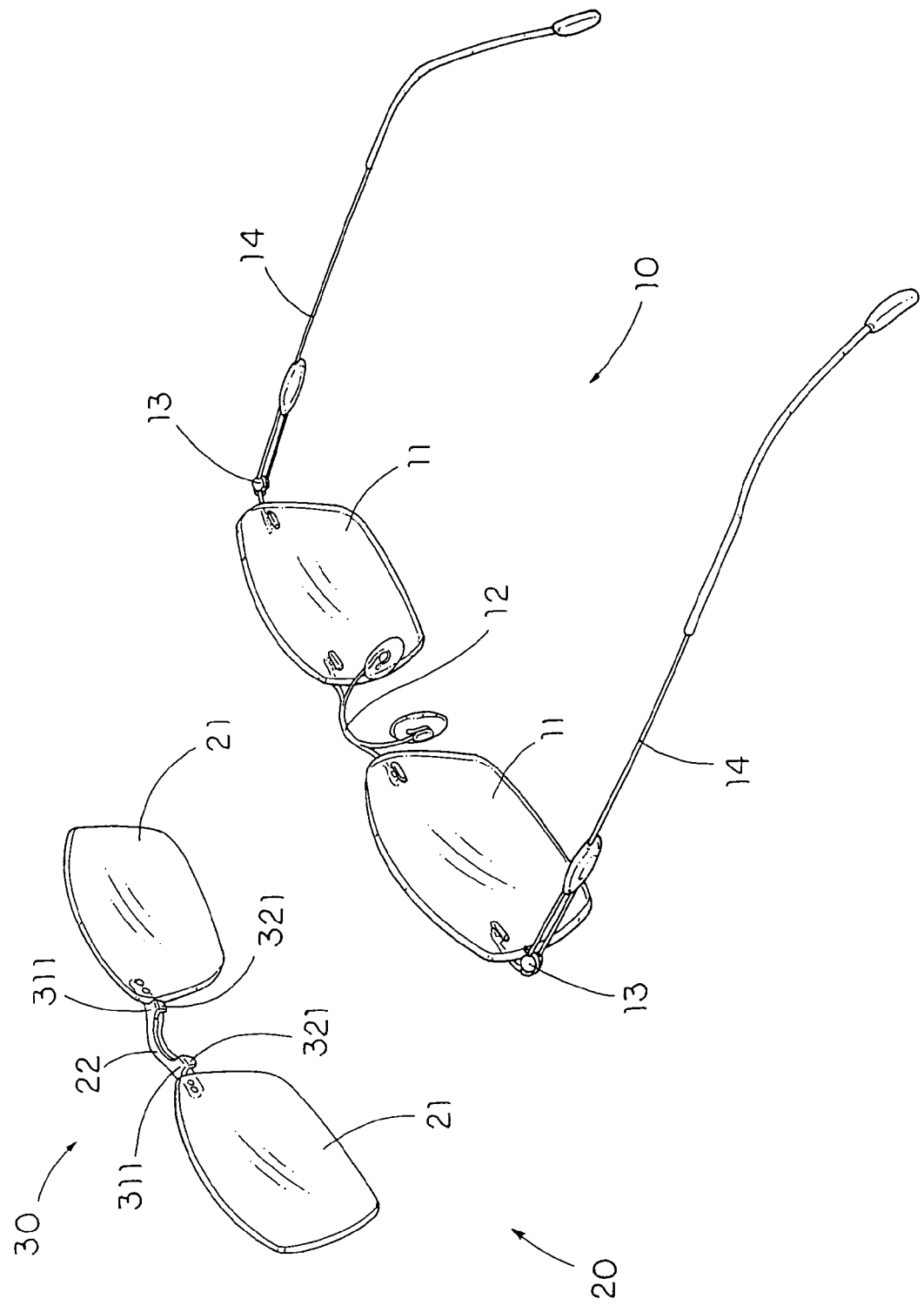
FIG. 1A is a perspective view of a spectacle set according to a first preferred embodiment of the present invention.
Figure 2A:
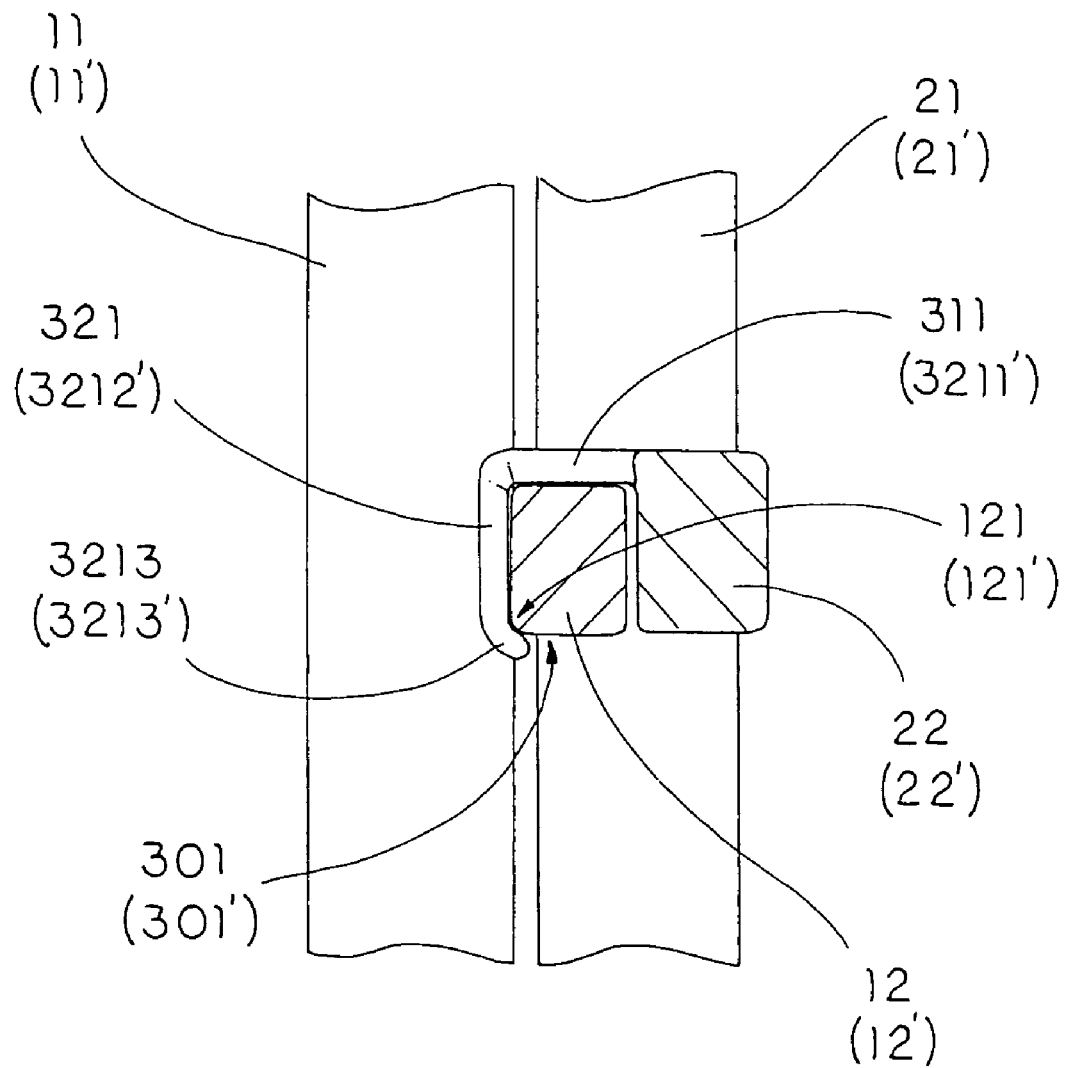
FIG. 2A is a schematic view of the spectacle set according to the above preferred embodiment, illustrating the detachable shelter frame being mounted in front of the primary spectacle.

Referring to FIGS. 1A and 2A of the drawings, a spectacle set according to a first embodiment of the present invention is illustrated, wherein the spectacle set comprise a primary spectacle 10 and a detachable shelter frame 20 detachably mounting in front of the primary spectacle 10.

The primary spectacle 10 comprises two lenses 11, a primary bridge 12 extended from two inner sides of the lenses 11 respectively, and two side extensions 13 provided at two outer sides of the lenses 11 for coupling a pair of temples 14 respectively.

Practically, the primary spectacle 10 can be constructed as a conventional spectacle frame to have a pair of lens rims or a rimless frame that the primary bridge 12 and the two side extensions 13 are directly fastened to the edges of the two lenses 11. In other words, the primary spectacle 10 does not require to modify its original structure for mounting the detachable shelter frame 20 thereon. So, the detachable shelter frame 20 of the present invention fits for all kinds of conventional primary spectacle 10. In other words, the user does not need to buy a set of expensive primary spectacle frame and corresponding shelter frame. The user can merely additionally purchase a shelter frame 20 of the present invention to fit his or her current spectacle frame that he or she has originally.

The detachable shelter frame 20 comprises two shelter lenses 21, a shelter bridge 22 extended between two inner sides of the shelter lenses 21, and a mounting arrangement 30 comprising at least a supporting member 31 rearwardly extended from the shelter bridge 22 to ride on the primary bridge 12 so as to support the shelter lenses 21 aligning with the lenses 11 respectively and a retention member 32 rearwardly extending to apply an urging force against the primary bridge 12 to engage with a rear side of the primary bridge 12 when the detachable shelter frame 20 is mounted in front of the primary spectacle 10 so as to substantially retain the detachable shelter frame 20 in position.

Figure 1B:
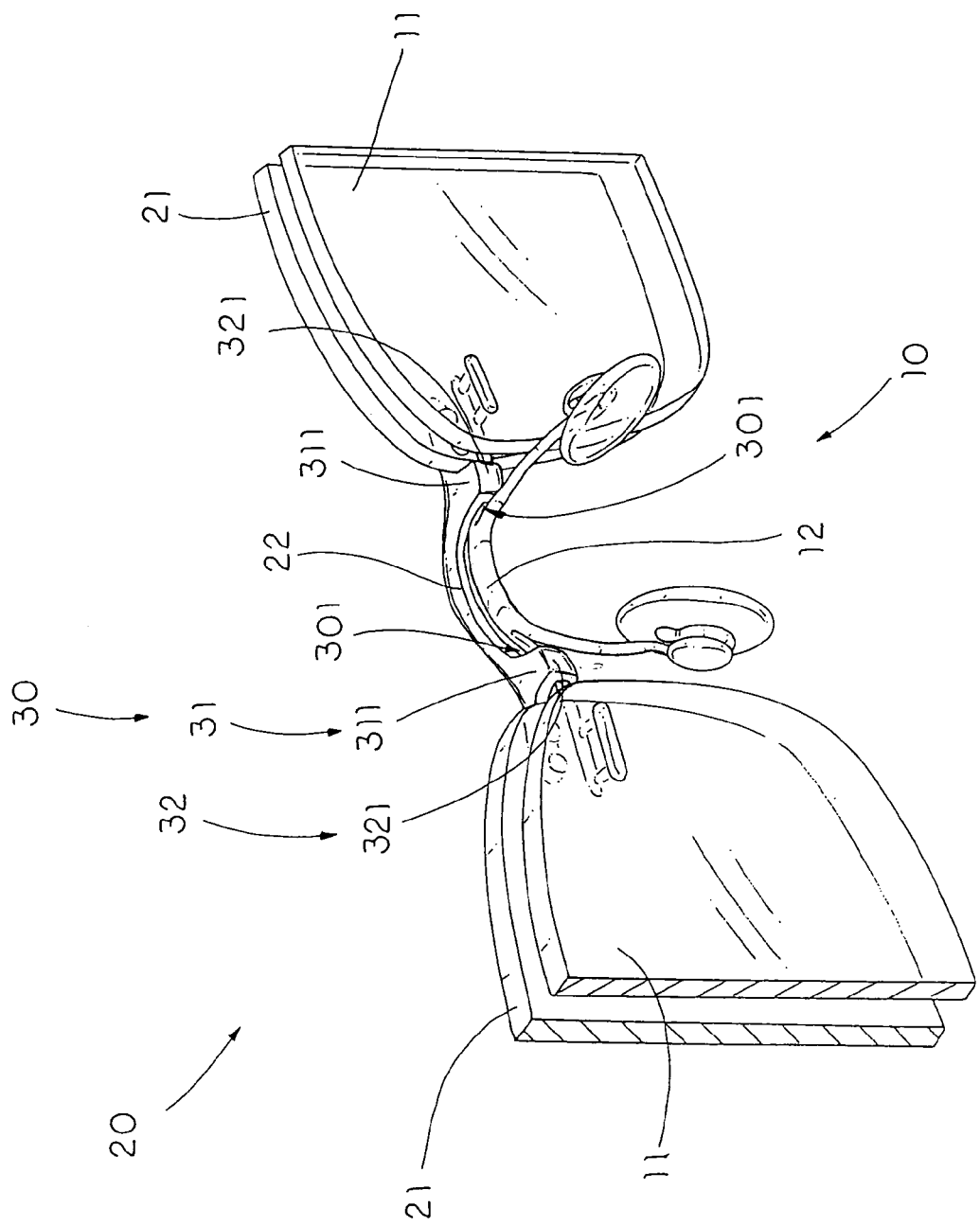
FIG. 1B is a partially perspective view of the spectacle set according to the above preferred embodiment of the present invention, illustrating the detachable shelter frame being mounted in front of the primary spectacle.

According to the preferred embodiment, the supporting member 31 comprises two supporting arms 311 rearwardly extended from two end portions of the shelter bridge 22 respectively to spacedly and rigidly ride on the primary bridge 12 so as to support a weight of the detachable shelter frame 20 at the primary bridge 12 when the detachable shelter frame 20 is mounted in front of the primary spectacle 10, as shown in FIG. 1B.

In other words, each of the supporting arms 311 has a length adapted to extend from the shelter bridge 22 to the rear side of the primary bridge 12 when the detachable shelter frame 20 is mounted in front of the primary spectacle 10. In addition, the supporting arms 311 are rigidly extended from the shelter bridge 22 to support on the primary bridge 12 so as to support the weight of the detachable shelter frame 20 at the primary bridge 12. Preferably, each of the supporting arms 311 is horizontally extended from the shelter bridge 22 to ride on the primary bridge 12.

The retention member 32 comprises two retention arms 321 downwardly extended from two rear ends of the two supporting arms 311 respectively to engage with the rear side of the primary bridge 12, wherein an engaging groove 301 is formed within the shelter bridge 22, the supporting arm 311 and the retention arm 321 for the primary bridge 12 slidably receiving in the engaging groove 301. In other words, the retention arms 321 are extended from the supporting arms 311 to form two mounting members having L-shaped cross section to mount at the primary bridge 12.

Each of the engaging grooves 301 has a width slightly larger than a thickness of the primary bridge 12 such that two end portions of the primary bridge 12 are fittingly received in the engaging grooves 301 respectively to engage the retention arms 321 with the rear side of the primary bridge 12 so as to retain the detachable shelter frame 20 in front of the primary spectacle 10.

As shown in FIGS. 1B and 2A, the mounting arrangement 30 is integrally extended from the shelter bridge 22 to form a one piece integral member such that the supporting arms 311 of the supporting member 31 are integrally extended from the two end portions of the shelter bridge 22 respectively and the retention arms 321 of the retention member 32 are integrally extended from the two rear ends of the two supporting arms 311 respectively. Preferably, the shelter bridge 22 and the mounting arrangement 30 are made of lightweight but durable material, such as plastic, such that the overall weight of the detachable shelter frame 20 can be substantially reduced while the detachable shelter frame 20 can precisely mount in front of the primary spectacle 10. In addition, the retention arms 321 are made of plastic such that the retention arms 321 are adapted to apply the urging force against the primary bridge 12 to engage with the rear side thereof.

Each of the retention arms 321 further has a bottom engaging tip 3213 extending inwardly to engage with an engaging edge 121 of the primary bridge 12 when the retention arm 321 engages with the rear side of the primary bridge 12.

Accordingly, the engaging edge 121 of the primary bridge 12 forms at a bottom edge thereof wherein when the supporting arms 311 ride on the primary bridge 12, the engaging tips 3213 of the retention arms 321 are slid at the rear side of the primary bridge 12 to apply the urging force thereto until the engaging tips 3213 of the retention arms 321 reach the engaging edge 121 of the primary bridge 12 so as to ensure the engagement between the retention arm 321 and the primary bridge 12. In other words, each of the retention arms 321 has a predetermined length downwardly extending to engage with the bottom edge as the engaging edge 121 of the primary bridge 12.

In order to mount the detachable shelter frame 20 in front of the primary spectacle 10, the wearer may merely use one hand to hold the shelter bridge 22 to align with the primary bridge 12 at a position that the retention arms 321 of the retention member 32 is aligned to the rear side of the primary bridge 12. Therefore, the wearer is able to apply a downward pulling force on the shelter bridge 22 against the primary bridge 12 to slide the primary bridge 12 into the engaging grooves 301 such that the engaging tips 3213 of the retention arms 321 are slid at the rear side of the primary bridge 12 to apply the urging force thereto. Once the supporting arms 311 of the supporting member 31 is supported on the primary bridge 12 to support the detachable shelter frame 20 by the primary bridge 12, the retention arms 321 are securely engaged with the rear side of the primary bridge 12 at a position that the engaging tips 3213 of the retention arms 321 reach the engaging edge 121 of the primary bridge 12 so as to retain the positions of the shelter lenses 21 of the detachable shelter frame 20 to align with the lenses 12 of the primary spectacle 10 respectively.

Figure 2B:
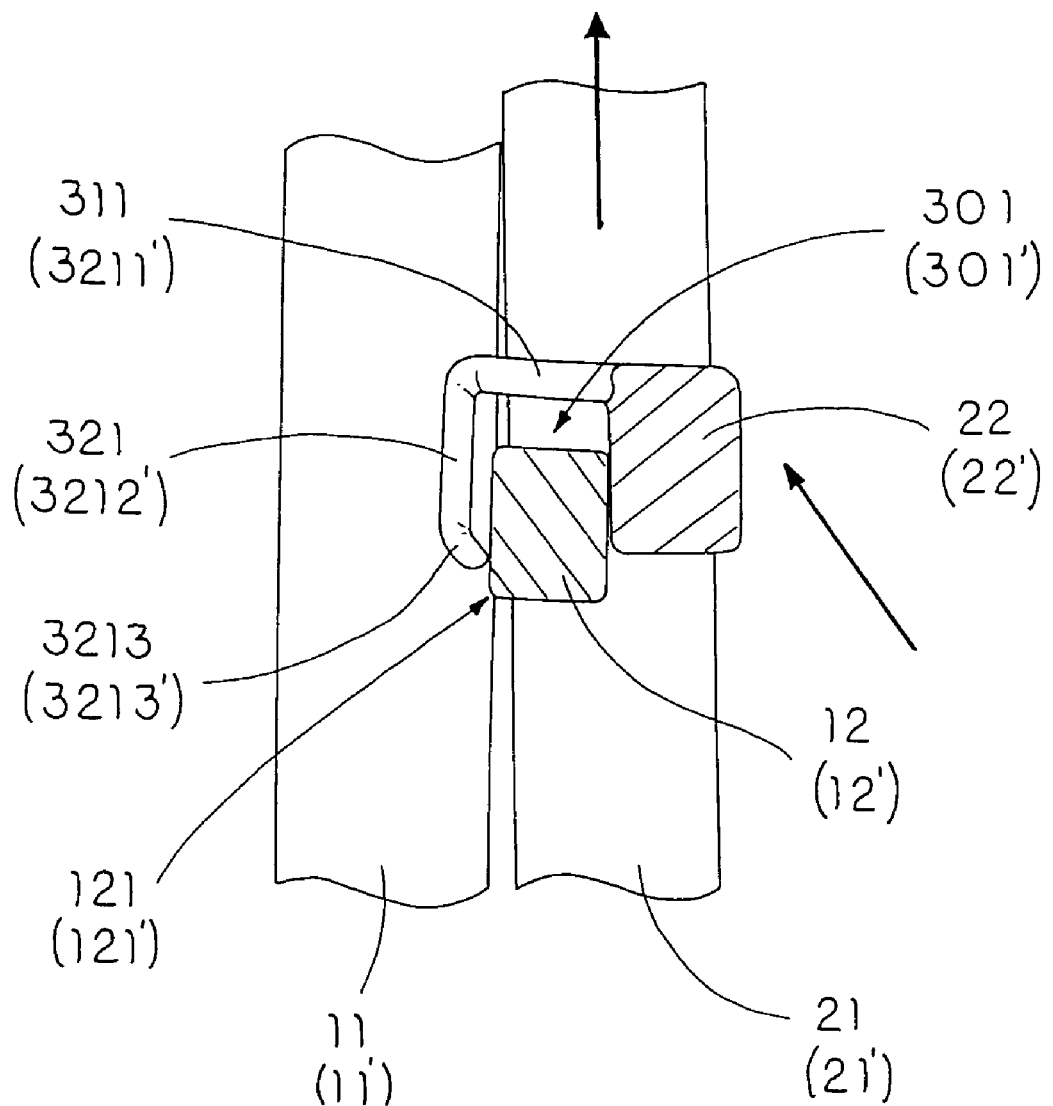
FIG. 2B illustrates the detachable shelter frame is detaching from the primary spectacle when an upward pulling force is applied on the detachable shelter frame according to the above preferred embodiment of the present invention.

For detaching the detachable shelter frame 20 from the primary spectacle 10, the wearer merely uses one hand to apply an upward pulling force against the shelter bridge 22 to slide the engaging tips 3213 of the retention arms 321 offset to the engaging edge 121 of the primary bridge 12. Once the engaging tips 3213 of the retention arms 321 are disengaged with the engaging edge 121 of the primary bridge 12, the urging force of the retention member 32 intends to pull the shelter bridge 22 upwardly so as to lift up the shelter bridge 22 from the primary bridge 12 to substantially detach the detachable shelter frame 20 from the primary spectacle 10, as shown in FIG. 2B. In other words, the engaging tips 3213 of the retention arms 321 are offset from the engaging edge 121 of the primary bridge 12, the detachable shelter frame 20 is automatically popped up from the primary spectacle 10.

It is worth to mention that that the mounting arrangement 30 is integrally extended from the shelter bridge 22 to formed a one piece rigid member, such that when the wearer applies the pulling force as the external force on the primary bridge 12, the mounting arrangement 30 is capable of withstanding the external force so as to prevent the primary bridge 13 from being distorted. In other words, the mounting arrangement 30 is strong enough to not only rigidly support the shelter lenses 21 in front of the lenses 11 but also substantially retain the detachable shelter frame 20 in position.

Figure 3:
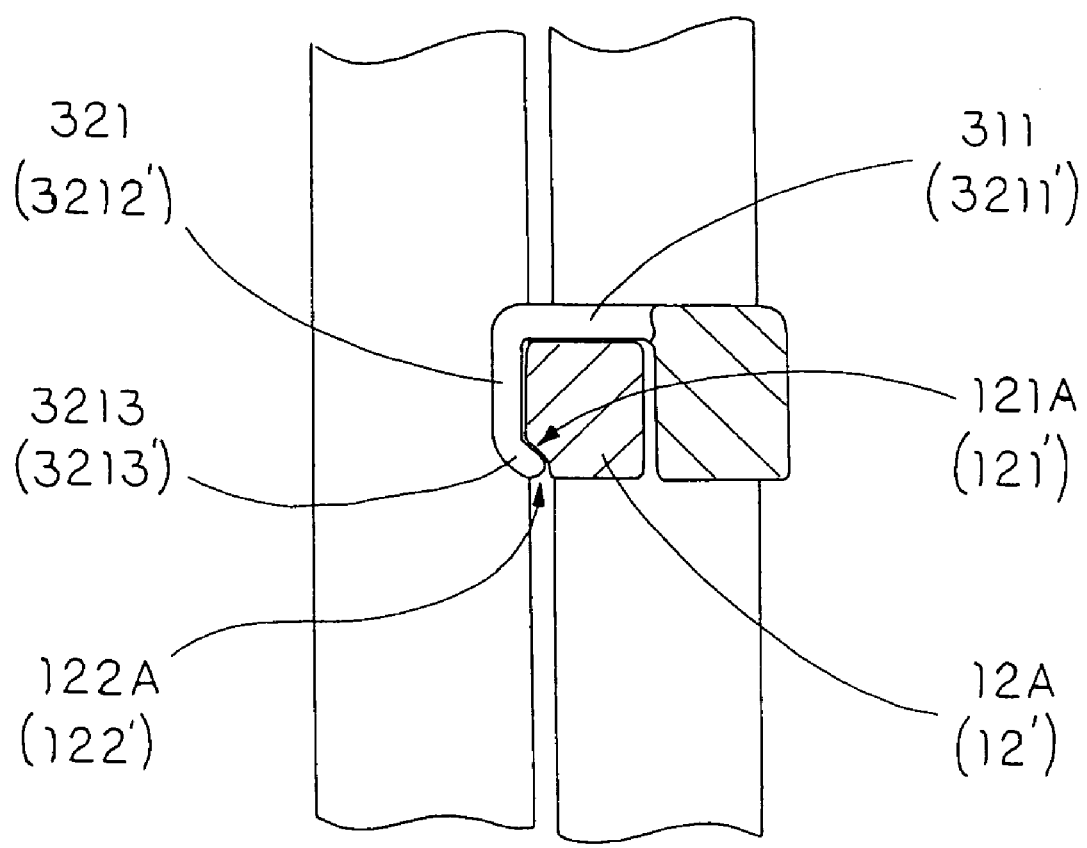
FIG. 3 illustrates a first alternative mode of the mounting arrangement of the spectacle set according to the above preferred embodiment, illustrating the detachable shelter frame being mounted in front of the primary spectacle.

FIG. 3 illustrates a first alternative mode of the primary bridge 12A which has a positioning groove 122A indently and longitudinally formed along the bottom edge of the primary bridge 12A wherein the engaging edge 121A is formed at a shoulder edge of the positioning groove 122A such that when the supporting arms 311 ride on the primary bridge 12A, the engaging tips 3213 of the retention arms 321 are slid at the rear side of the primary bridge 12A to apply the urging force thereto until the engaging tips 3213 of the retention arms 321 reach the engaging edge 121A of the primary bridge 12A that the engaging tips 3213 of the retention arms 321 are received at the positioning groove 122A so as to ensure the engagement between the retention arm 321 and the primary bridge 12A.

Figure 4:
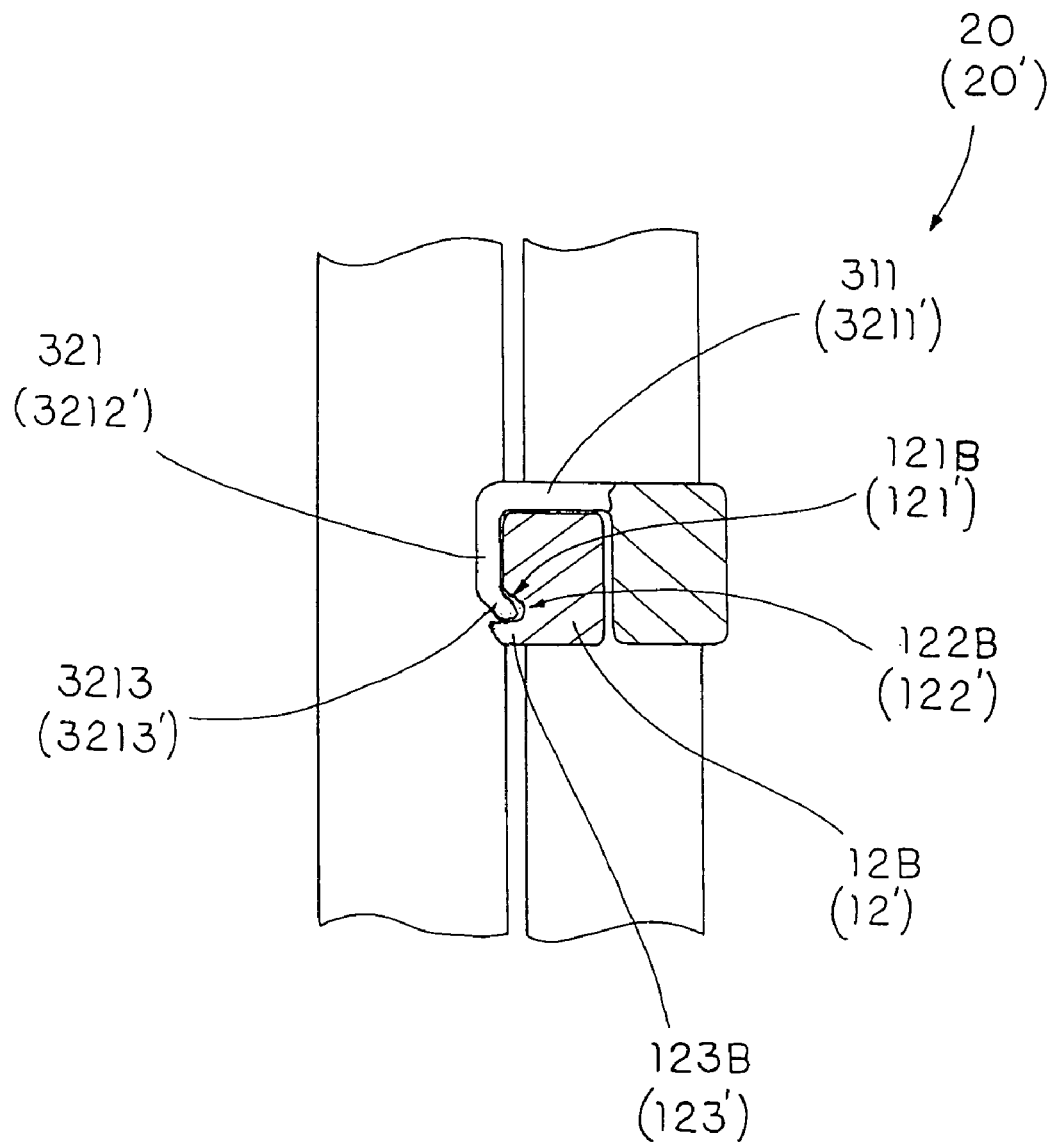
FIG. 4 illustrates a second alternative mode of the mounting arrangement of the spectacle 5 set according to the above preferred embodiment, illustrating the detachable shelter frame being mounted in front of the primary spectacle.

FIG. 4 illustrates a second alternative mode of the primary bridge 12B which has a positioning groove 122B indently and longitudinally formed along a bottom portion of the primary bridge 12B wherein the engaging edge 121B is formed at a shoulder edge of the positioning groove 122B such that when the supporting arms 311 ride on the primary bridge 12B, the engaging tips 3213 of the retention arms 321 are slid at the rear side of the primary bridge 12B to apply the urging force thereto until the engaging tips 3213 of the retention arms 321 reach the engaging edge 121B of the primary bridge 12B that the engaging tips 3213 of the retention arms 321 are received at the positioning groove 122B while a bottom edge of the primary bridge 12B forms a blocking edge 123B to block the engaging tips 3213 of the retention arms 321 to further slide downwardly so as to ensure the engagement between the retention arm 321 and the primary bridge 12B.

It is worth to mention that the blocking edge 123B of the primary bridge 12B can also substantially support the weight of the detachable shelter frame 20 since the blocking edge 123B of the primary bridge 12B supports the engaging tips 3213 of the retention arms 321 thereon. In addition, the length of the retention arm 321 can be substantially reduced to engage with the rear side of the primary bridge 12B.

Figure 5:
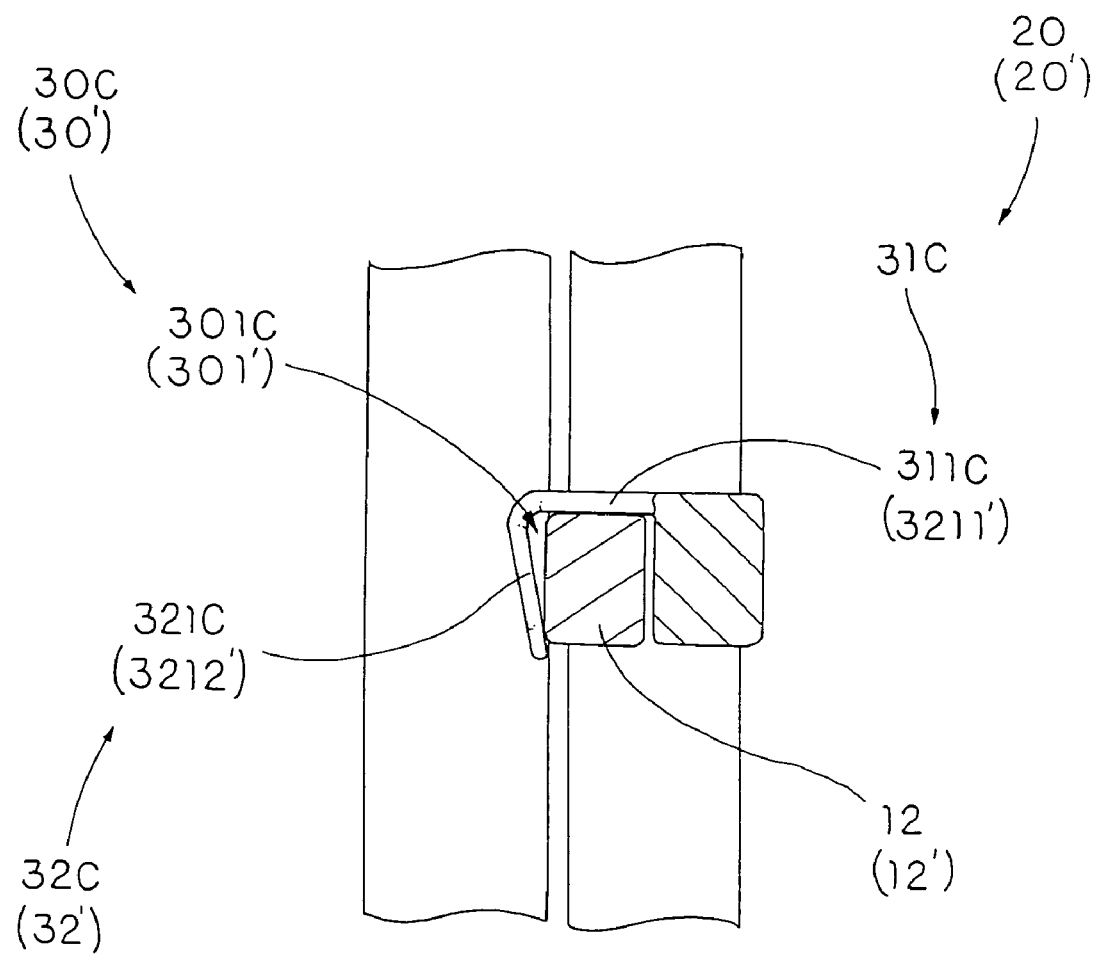
FIG. 5 illustrates a third alternative mode of the mounting arrangement of the spectacle set according to the above preferred embodiment, illustrating the detachable shelter frame being mounted in front of the primary spectacle.

FIG. 5 illustrates an alternative mode of the mounting arrangement 30C wherein the retention arms 321C of the retention member 32C are downwardly and inwardly extended from two rear ends of the two supporting arms 311C of the supporting member 31C respectively to engage with the rear side of the primary bridge 12, wherein an engaging groove 301C is formed within the shelter bridge 22, the supporting arm 311C and the retention arm 321C for the primary bridge 12 slidably receiving in the engaging groove 301C.

As shown in FIG. 5, the engaging groove 301C has a width gradually reducing from the supporting arm 311C towards a downward opening at a bottom end of the retention arm 321C such that when the retention arm 321C is slidably engaged with the rear side of the primary bridge 12, the retention arm 321C applies the urging force against the primary bridge 12 to substantially retain the detachable shelter frame 20 in position.

Figure 6:
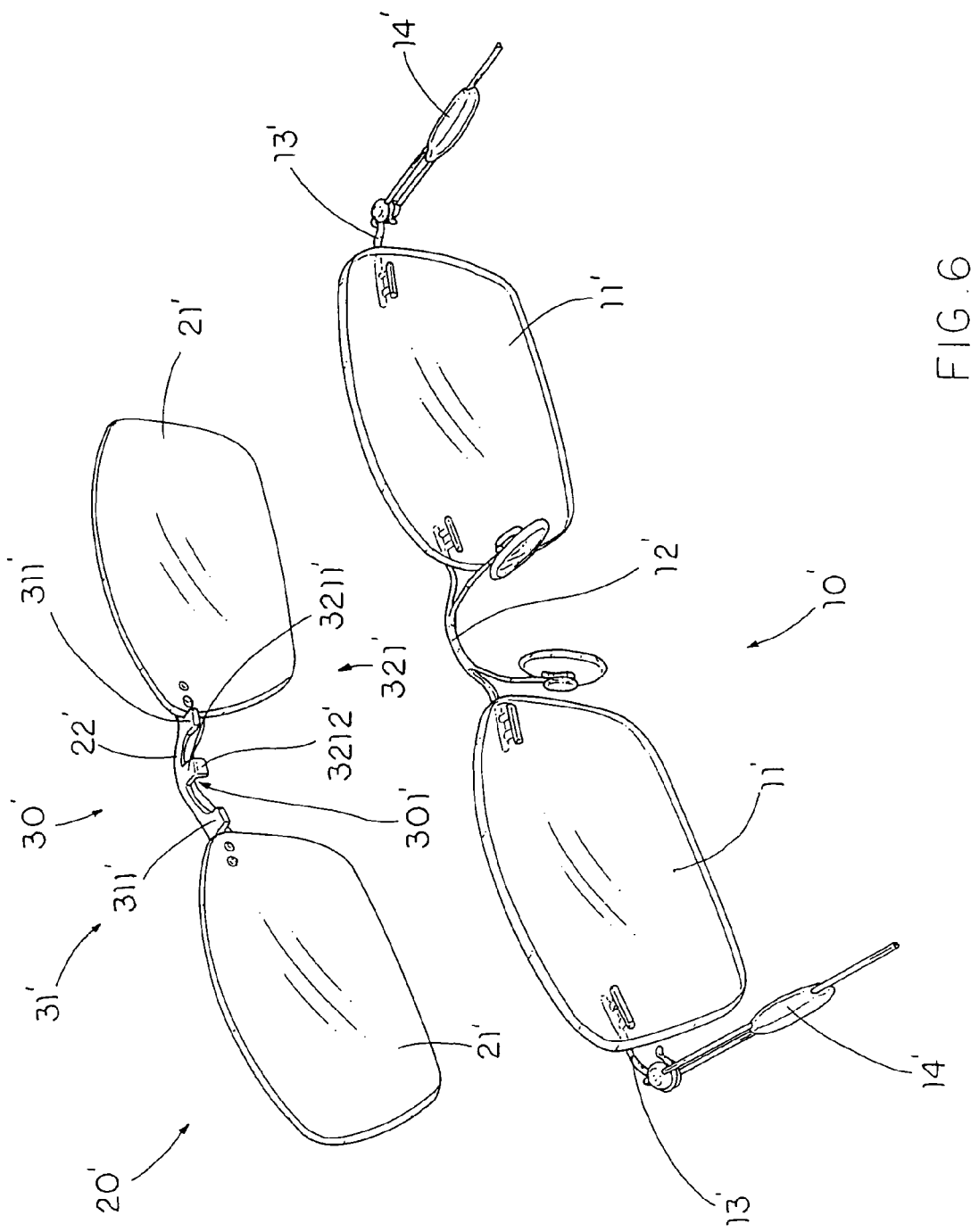
FIG. 6 is a perspective view of a spectacle set according to a second preferred embodiment of the present invention.
Figure 7:
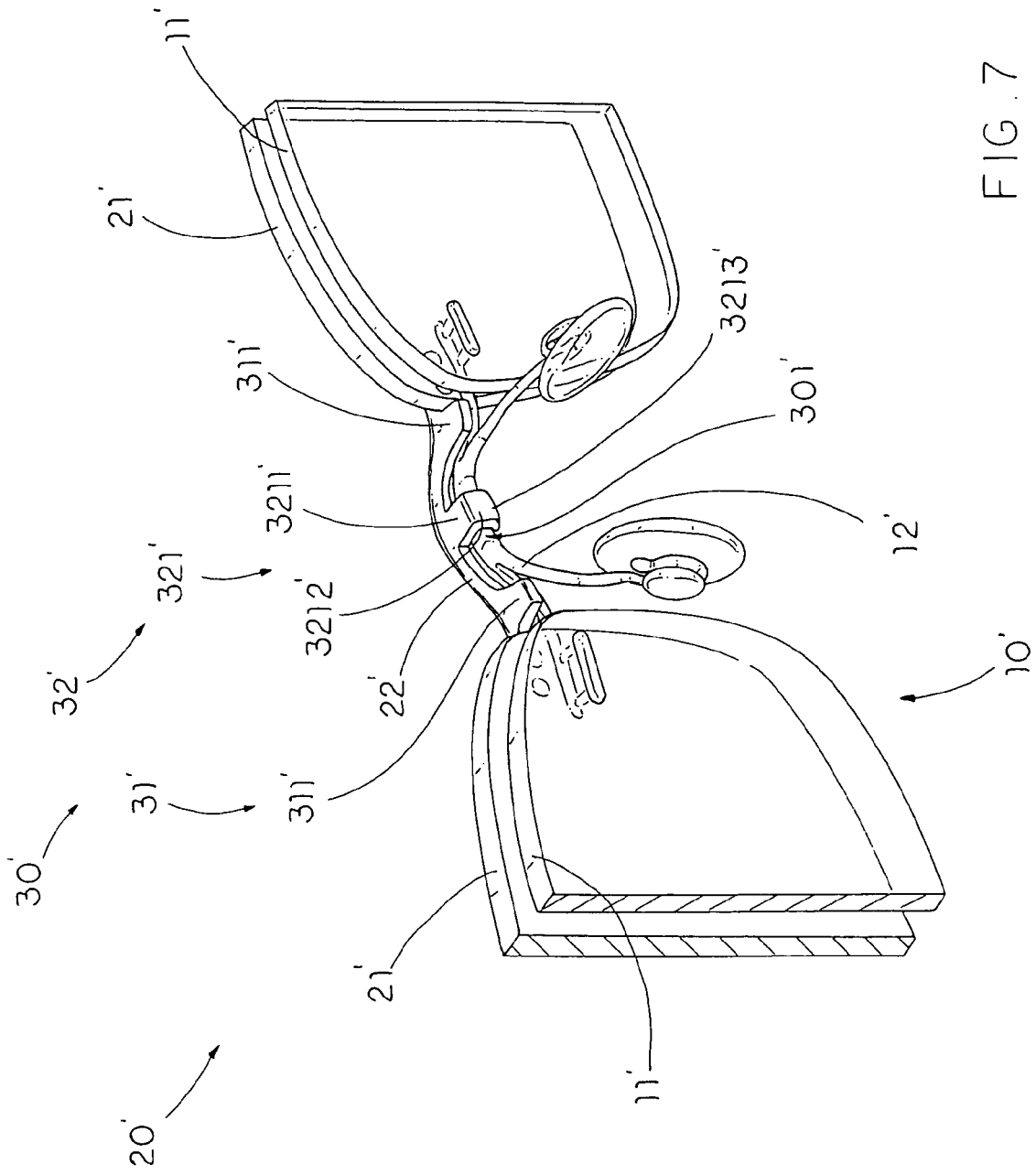
FIG. 7 is a partially perspective view of the spectacle set according to the above preferred embodiment, illustrating the detachable shelter frame being mounted in front of the primary spectacle.

As shown in FIGS. 6 and 7, a spectacle set of a second embodiment illustrates an alternative mode of the first embodiment of the present invention, wherein the detachable shelter frame 20' is detachably mounting in front of the primary spectacle 10'.

The primary spectacle 10' comprises two lenses 11', a primary bridge 12' extended from two inner sides of the lenses 11' respectively, and two side extensions 13' provided at two outer sides of the lenses 11' for coupling a pair of temples 14' respectively.

The detachable shelter frame 20' comprises two shelter lenses 21', a shelter bridge 22' extended between two inner sides of the shelter lenses 21', and a mounting arrangement 30' comprising at least a supporting member 31' rearwardly extended from the shelter bridge 22' to ride on the primary bridge 12' so as to support the shelter lenses 21' aligning with the lenses 11' respectively and a retention member 32' rearwardly extending to apply an urging force against the primary bridge 12' to engage with a rear side of the primary bridge 12' when the detachable shelter frame 20' is mounted in front of the primary spectacle 10' so as to substantially retain the detachable shelter frame 20' in position.

As shown in FIG. 6, the supporting member 31' comprises two supporting arms 311' rearwardly extended from two end portions of the shelter bridge 22' respectively to spacedly ride on the primary bridge 12' so as to support a weight of the detachable shelter frame 20' at the primary bridge 12' when the detachable shelter frame 20' is mounted in front of the primary spectacle 10'. In other words, the supporting arms 311' are integrally and rigidly extended from the shelter bridge 22' to support on the primary bridge 12' so as to support the weight of the detachable shelter frame 20' at the primary bridge 12'. Preferably, each of the supporting arms 311' is horizontally extended from the shelter bridge 22' to ride on the primary bridge 12'.

The retention member 32 comprises a retention arm 321' rearwardly extended from a mid-portion of the shelter bridge 22' to engage with the rear side of the primary bridge 12', wherein the retention arm 321', having a L-shape cross section, has an extending portion 3211' rearwardly extended towards the primary bridge 12' and an retaining portion 3212' which is downwardly extended from the extending portion 3211' to engage with the rear side of the primary bridge 12'.

An engaging groove 301' is formed within the shelter bridge 22', the extending portion 3211' of the retention arm 321' and the retaining portion 3212' thereof for the primary bridge 12 slidably receiving in the engaging groove 301'.

Each of the engaging grooves 301' has a width slightly larger than a thickness of the primary bridge 12' such that a mid-portion of the primary bridge 12' are fittingly received in the engaging groove 301' to engage the retention arm 321' with the rear side of the primary bridge 12' so as to retain the detachable shelter frame 20 in front of the primary spectacle 10'.

As shown FIG. 7, the retention arm 321' is integrally extended from the shelter bridge 22' to form a one piece integral member. Accordingly, the portion 3211' of the retention arm 321' has a length adapted to extend from the shelter bridge 12' to the rear side of the primary bridge 12' when the detachable shelter frame 20' is mounted in front of the primary spectacle 10'. In addition, the extending portion 3211' of the retention arm 321' is rearwardly extended to ride on the primary bridge 12' and the retaining portion 3212' of the retention arm 321' is arranged to apply the urging force against the primary bridge 12' so as to substantially hold the detachable shelter frame 20' in front of the primary spectacle 10'.

The retention arm 321' further has a bottom engaging tip 3213' extending inwardly to engage with an engaging edge 121' of the primary bridge 12' when the retention arm 321' engages with the rear side of the primary bridge 12'. Accordingly, the engaging edge 121' of the primary bridge 12' forms at a bottom edge thereof wherein when the extending portion 3211' of the retention arm 321' rides on the primary bridge 12', the engaging tip 3213' of the retention arm 321' is slid at the rear side of the primary bridge 12' to apply the urging force thereto until the engaging tip 3213' of the retention arm 321' reaches the engaging edge 121' of the primary bridge 12' so as to ensure the engagement between the retention arm 321' and the primary bridge 12'. In other words, the retaining portion 3212' of the retention arm 321' has a predetermined length downwardly extending to engage with the bottom edge as the engaging edge 121' of the primary bridge 12'.

According to the second embodiment, the extending portion 3211' of the retention arm 321' is embodied as the supporting arm 311 to ride on the primary bridge 12. Therefore, it can be further modified that the retaining portion 3212' of the retention arm 321' to construct as the alternative modes of the first embodiment as shown in FIGS. 2A to 5. In other words, the engaging tip 3213' of the retention arm 321' can be slid to engage with the engaging edge 121' (bottom edge) of the primary bridge 12' as shown in FIG. 2A. The primary bridge 12' can further have a positioning groove 122' for the engaging tip 3213' of the retention arm 321' engaging therewith as shown in FIG. 3 and a bottom edge of the primary bridge 12' forms a blocking edge 123' to block the engaging tips 3211' of the retention arms 321' to further slide downwardly as shown in FIG. 4. Thus, the engaging groove 301' can be constructed to have a width gradually reducing from the engaging portion 3211' of the retention arm 321' towards a downward opening at a bottom end of the retention arm 321' to apply the urging force against the primary bridge 12' when the primary bridge 12' receives in the engaging groove 301', as shown in FIG. 5.

Figure 8:
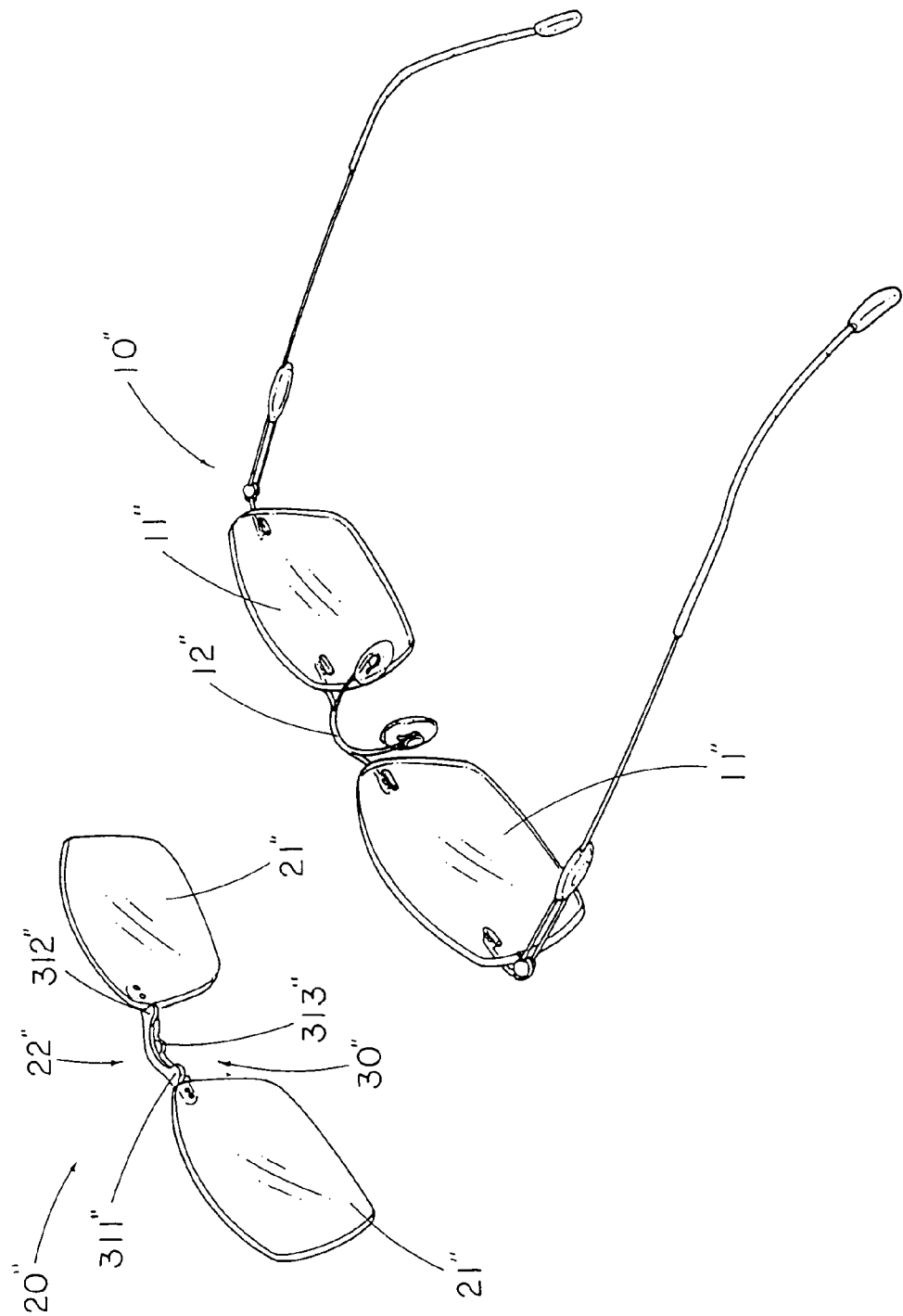
FIG. 8 is a perspective view of a spectacle set according to a third preferred embodiment of the present invention, illustrating that the shelter frame is detached from the primary spectacle.
Figure 9:
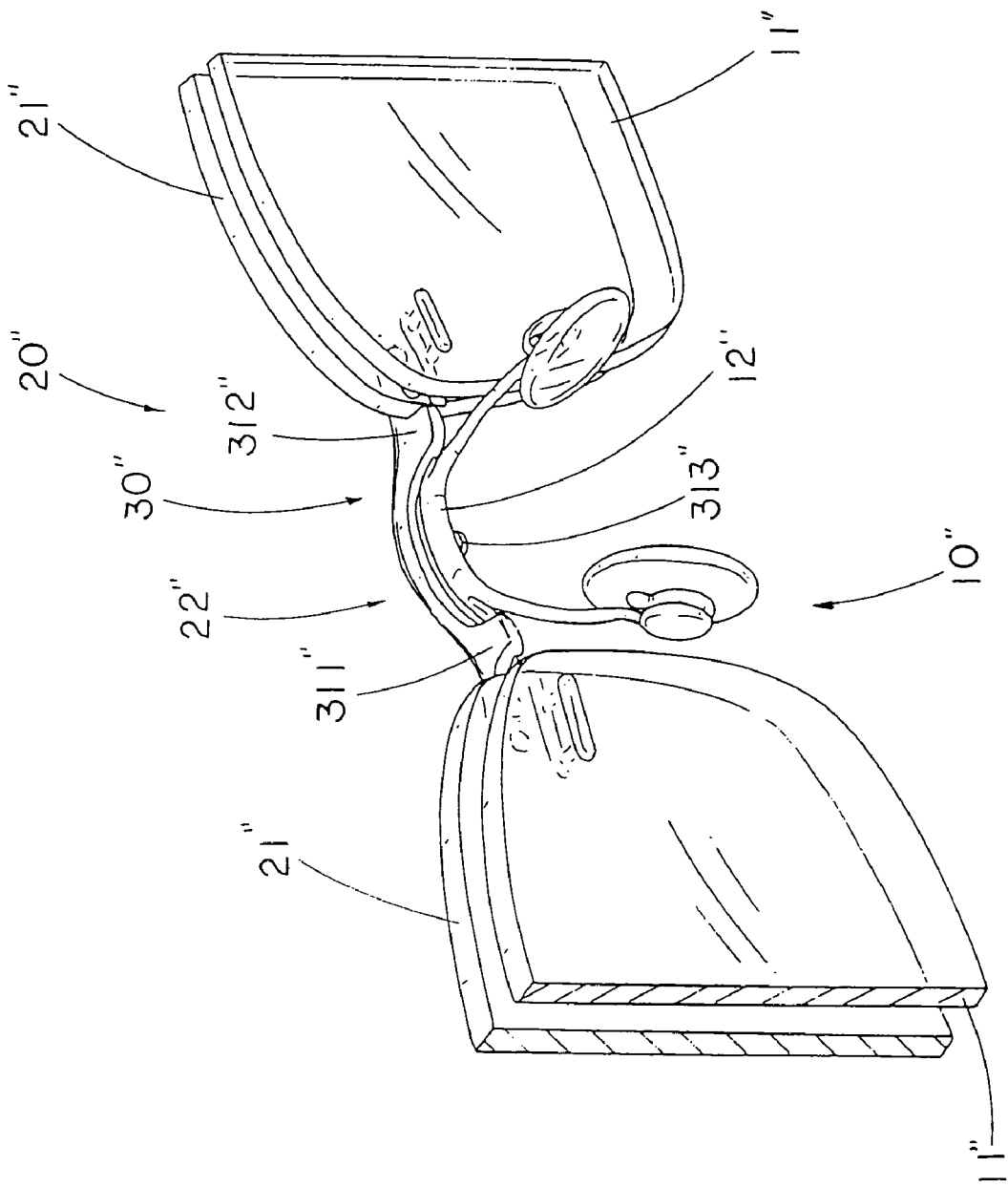
FIG. 9 is a perspective view of a spectacle set according to a third preferred embodiment of the present invention, illustrating that the shelter frame is attached on the primary spectacle
Figure 10:
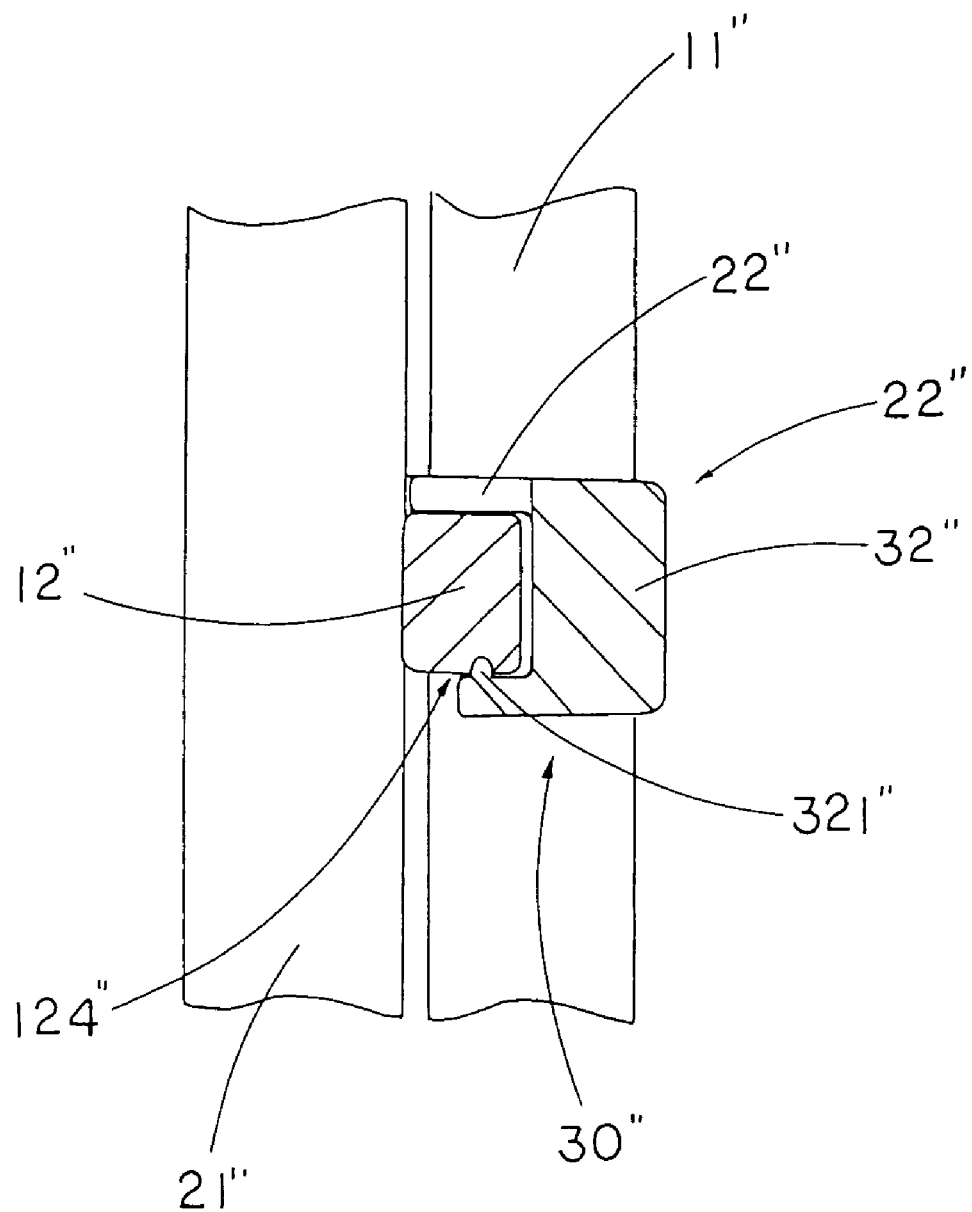
FIG. 10 is a section side view of the spectacle set according to the above third preferred embodiment of the present invention.

Referring to FIG. 8 to FIG. 10 of the drawings, the spectacle set according to a third preferred embodiment of the present invention is illustrated. The third preferred embodiment is similar to the first preferred embodiment except the detachable shelter frame 20".

According to the third preferred embodiment, the detachable shelter frame 20" comprises two shelter lenses 21", a shelter bridge 22" extended between two inner sides of the shelter lenses 21", and a mounting arrangement 30" comprising first through third supporting members 311", 312", 313"

spacedly and rearwardly extended from the shelter bridge 22" to engage on the primary bridge 12" so as to create a three-point support for the shelter frame 20" while the shelter lenses 21" is aligning with the lenses 11" respectively, and a retention member 32" rearwardly extending to apply an urging force against the primary bridge 12" to engage with the primary bridge 12" when the detachable shelter frame 20" is mounted in front of the primary spectacle 10" so as to substantially retain the detachable shelter frame 20" in a balance manner.

Referring to FIG. 10 of the drawings, the first and the second supporting member 311", 312" are rearwardly extended from an upper portion of the shelter bridge 22" while the third supporting member 313" is rearwardly extended from a lower portion of the shelter bridge 22", wherein the first and second supporting members 311", 312" are substantially rest on the primary bridge 12" to support the detachable shelter frame 20" in front of the primary spectacle 10" while the third supporting member 313" is engaged with a bottom side of the primary bridge 12" to retain the detachable shelter frame 20" in position so as to securely mount the detachable shelter frame 20" in front of the primary spectacle frame 10" with the three-point support.

According to the third preferred embodiment of the present invention, a length of the first and the second supporting members 311", 312" is preferably longer than a length of the third supporting member 313" so that the shelter frame 20" is capable of being substantially supported on the primary bridge 12".

Moreover, the retention member 32" comprises a retention arm 321" integrally and upwardly protruded from the third supporting member 313" to bias against a bottom surface 124" of the primary bridge 12" when it is engaged with the shelter frame 20" at the elongated holding channel 33". It is worth mentioning that the supporting members 311", 312", 313" are made of elastic materials for facilitating easy and convenient engagement between the shelter frame 20" and the primary bridge 12".

Figure 11:
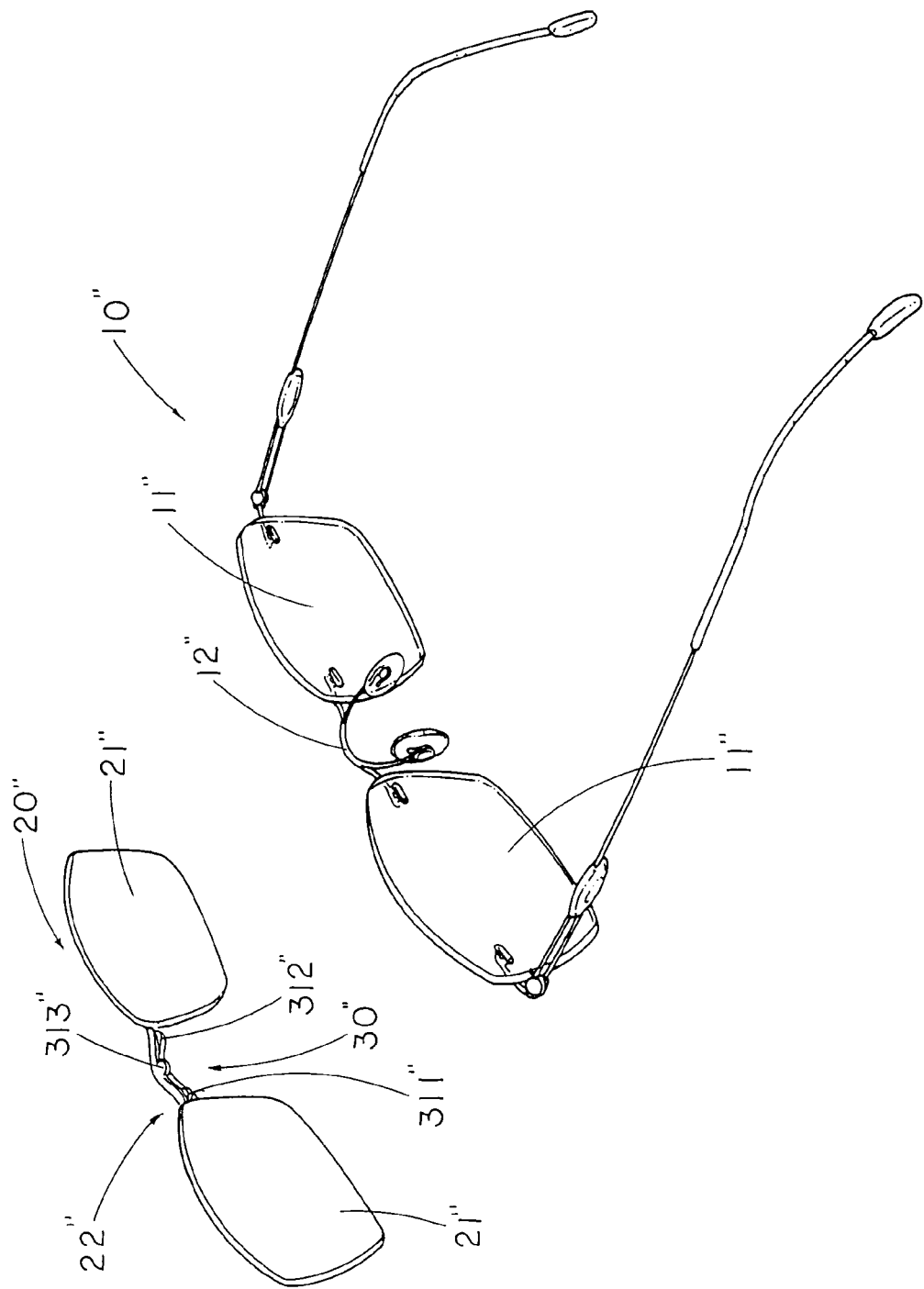
FIG. 11 is an alternative mode of the spectacle set according to the above third preferred embodiment of the present invention.

As an obvious alternative to the supporting members 311", 312", 313", as shown in FIG. 11 of the drawings, the position of the first and the second supporting members 311", 312" and the third supporting members 313" may be interchanged so that the first and the second supporting members 311", 312" are extended from a bottom portion of the shelter bridge 22" while the third supporting member 313" is extended from the upper portion of the shelter bridge 22". In other words, the first through third supporting members 311", 312", 313" create the three-point support to the shelter frame 20" for ensuring secure engagement between the shelter bridge 22" and the primary bridge 12".

Accordingly, the third supporting member 313" is substantially rest on the primary bridge 12" to support the detachable shelter frame 20" in front of the primary spectacle 10" while the first and second supporting members 311", 312" are engaged with a bottom side 121" of the primary bridge 12" to retain the detachable shelter frame 20" in position so as to securely mount the detachable shelter frame 20" in front of the primary spectacle frame 10" with the above-mentioned three-point support.

In such a situation, the length of the third supporting member 313" is longer than the length of the first and the second supporting members 311", 312". Moreover, the retention member 32" further comprises one more retention arm 321"; the two retention arms 321" are upwardly and integrally protruded from the first and the second supporting members 311", 312" to bias against the primary bridge 12".

Figure 12:
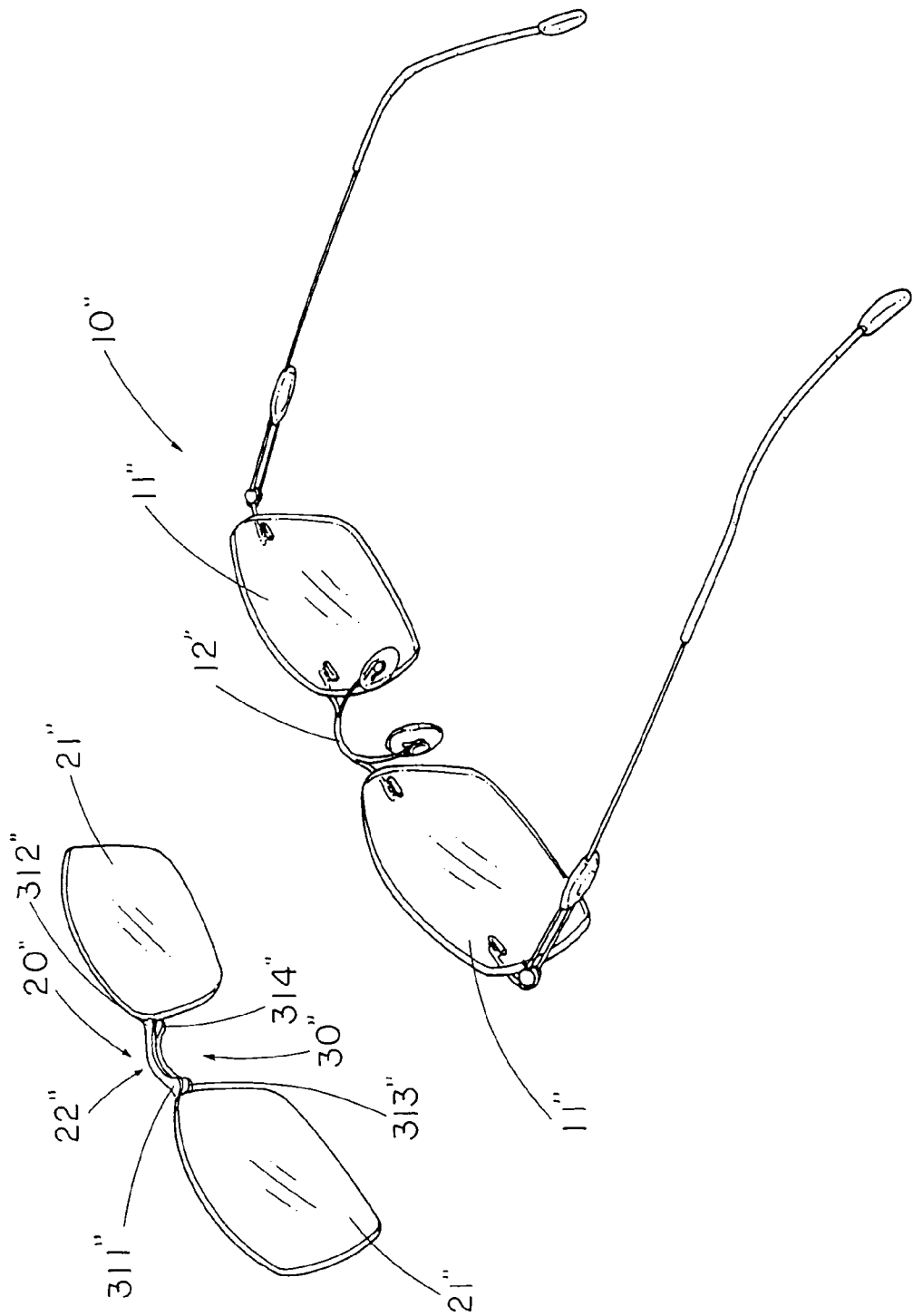
FIG. 12 is an alternative mode of the spectacle set according to the above third preferred embodiment of the present invention, illustrating that there are four supporting members extended from the shelter bridge of the detachable shelter frame.

Referring to FIG. 12 of the drawings, an alternative mode of the spectacle set according to the above third preferred embodiment of the present invention is illustrated. The alternative mode is similar to the third preferred embodiment except the mounting arrangement 30". According to the alternative mode, the mounting arrangement 30" further comprises a fourth supporting member 314" rearwardly extended from the upper portion of the shelter bridge 22" to engage with the primary bridge 12" in the similar fashion as the first supporting member 311".

In other words, the first though fourth supporting members 311", 312", 313", 314" provide a four-point support to the shelter frame 20", wherein the primary bridge 12" is arranged to engage with the shelter bridge 22" between the four supporting members 311", 312", 313", 314" in a balance manner so that the shelter frame 20" is capable of securely attaching on the primary spectacle 10".

As shown in FIG. 11 of the drawings, the first through four supporting members 311", 312", 313", 314" are rearwardly and integrally extended from four corner portions of the shelter bridge 22" respectively to engage with the primary bridge 12", wherein the first and the second supporting members 311", 312" are extended from the upper portion of the shelter bridge 22" while the third and the fourth supporting members 313", 314" are extended from the lower portion of the shelter bridge 22".

As a result, the two retention arms 321" are integrally and upwardly protruded from the third and the fourth supporting members 313", 314" bias against the bottom side 124" of the primary bridge 12".

Figure 13:
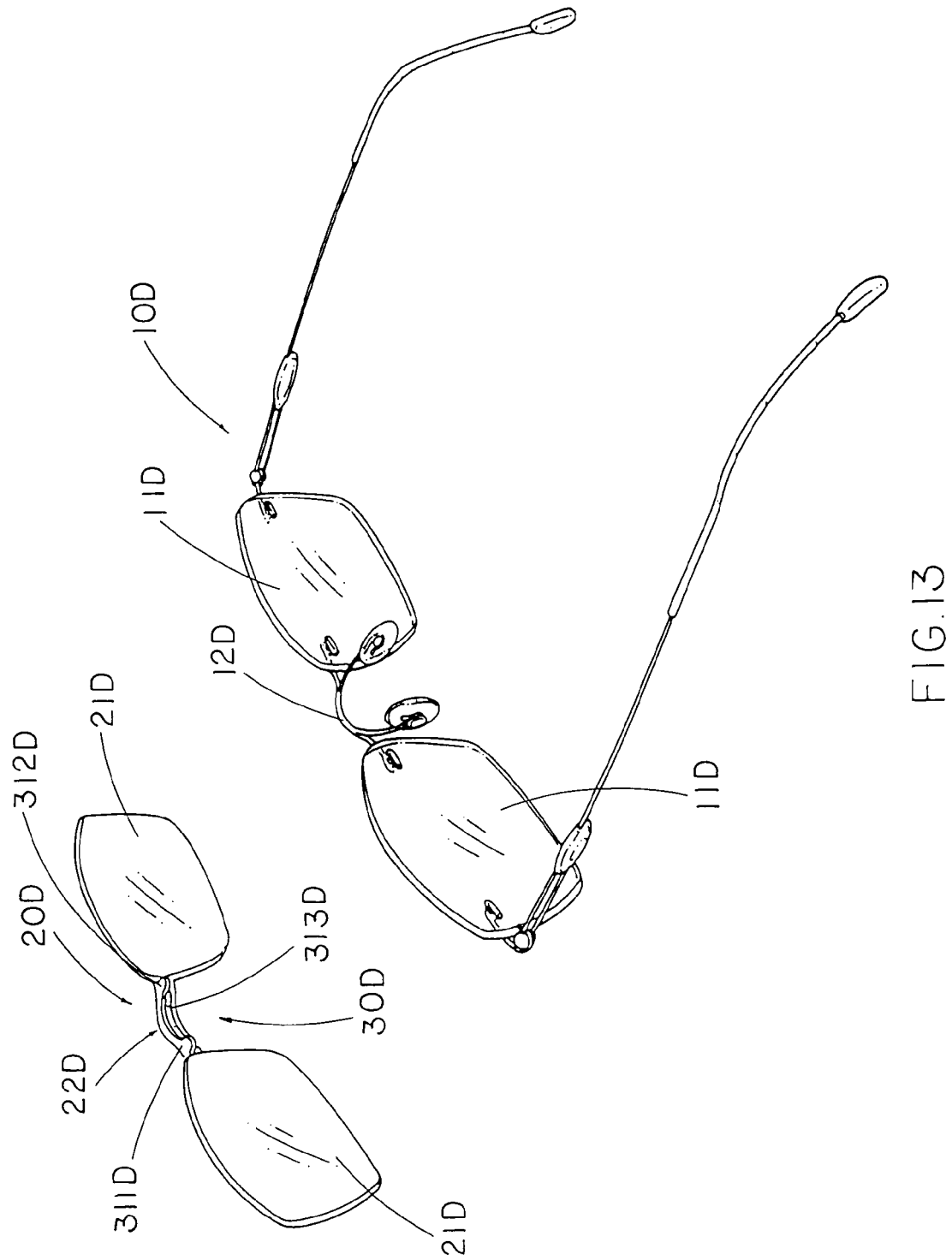
FIG. 13 is a perspective view of a spectacle set according to a fourth preferred embodiment of the present invention, illustrating that the shelter frame is detached on the primary spectacle.
Figure 14:
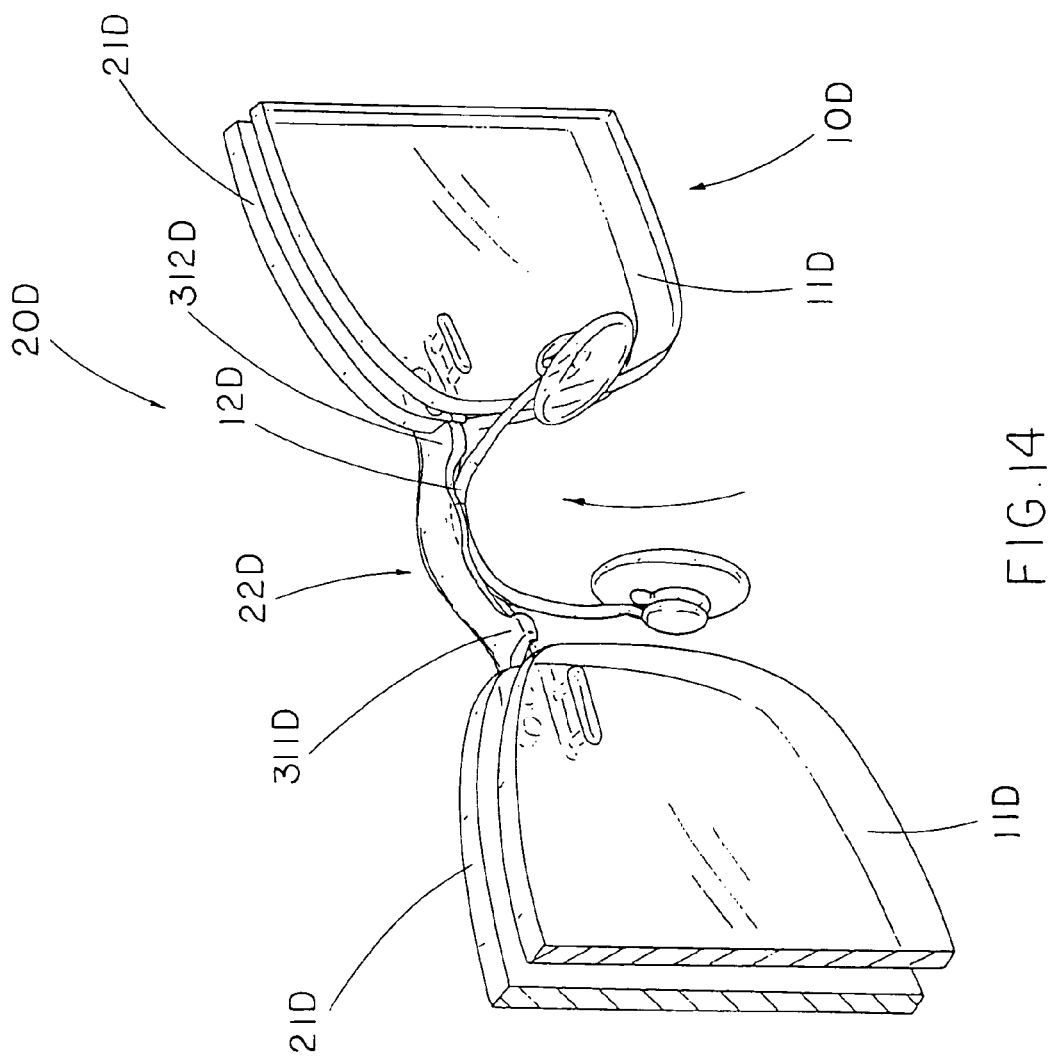
FIG. 14 is a perspective view of a spectacle set according to a fourth preferred embodiment of the present invention, illustrating that the shelter frame is attached on the primary spectacle.
Figure 15:
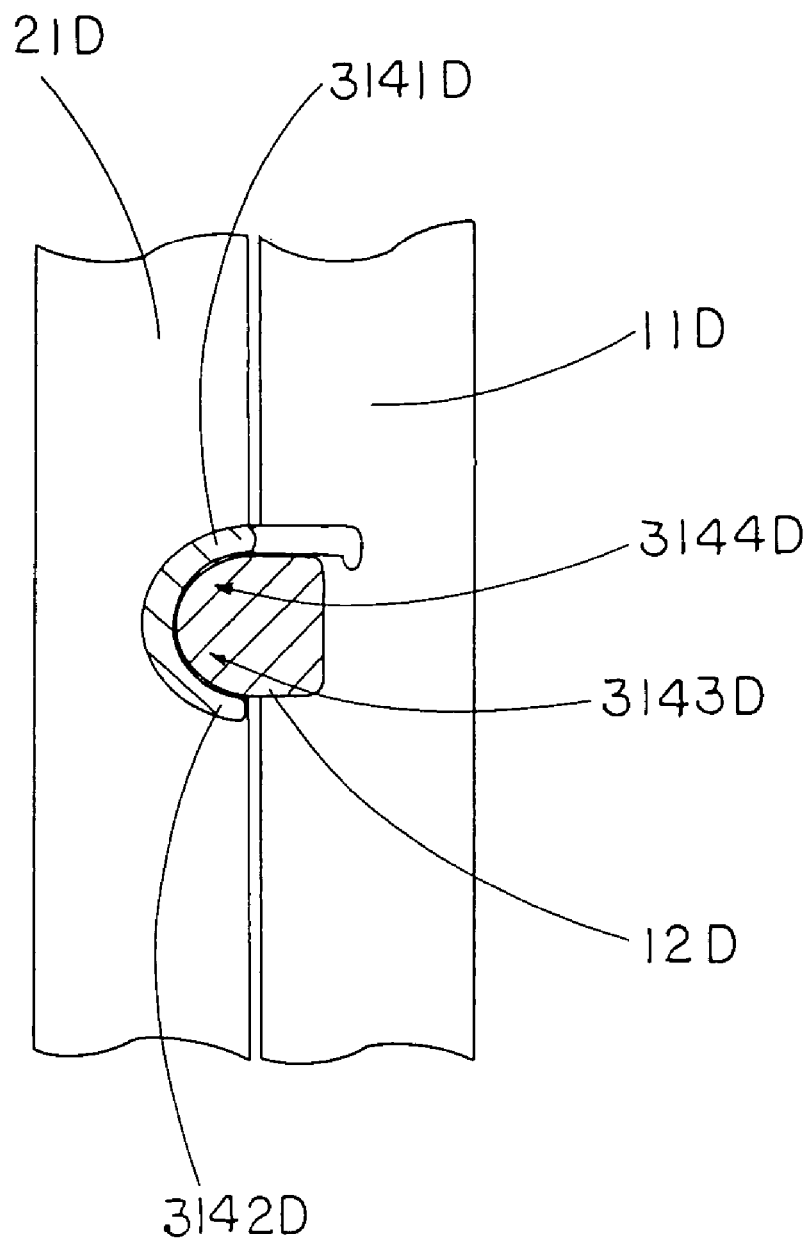
FIG. 15 is a section side view of the spectacle set according to the above fourth preferred embodiment of the present invention.

Referring to FIG. 13 to FIG. 15 of the drawings, a spectacle set according to a fourth preferred embodiment of the present invention is illustrated. The fourth preferred embodiment is similar to the third preferred embodiment except the detachable shelter frame 20D.

According to the fourth preferred embodiment, the detachable shelter frame 20D comprises two shelter lenses 21D, a shelter bridge 22D extended between two inner sides of the shelter lenses 21D, and a mounting arrangement 30D comprising first through third supporting members 311D, 312D, 313D spacedly and rearwardly extended from the detachable shelter frame 20D to engage on the primary spectacle 10D so as to create a three-point support for the shelter frame 20D while the shelter lenses 21D are aligning with the lenses 11D respectively, and a retention member 32D rearwardly extending to apply an urging force against the primary bridge 12D to engage with the primary bridge 12D when the detachable shelter frame 20D is mounted in front of the primary spectacle 11D so as to substantially retain the detachable shelter frame 20D in a balance manner.

According to the fourth preferred embodiment, the first through third supporting members 311D, 312D, 313D are rearwardly provided from the shelter bridge 22D wherein the first and the second supporting members 311D, 312D are rearwardly extended from two side portions of the shelter bridge 22D to ride on the primary bridge 12D of the primary spectacle 10D, while the third supporting member 313D is rearwardly provided at a mid portion of the shelter bridge 22D to engage with the primary bridge 12D of the primary spectacle 10D.

Specifically, the third supporting member 313D is integrally formed at a rear side of the shelter bridge 22D to form an attaching groove 3144D having a C-shaped cross section at the shelter bridge 22D for securely engaging with a mid portion of a front side of the primary bridge 12D so as to retain the detachable shelter frame 20D in position, wherein the first and the second supporting members 311D, 312D are rearwardly and spacedly extended from an upper portion of two end portions of the shelter bridge 22D respectively to substantially rest on the primary bridge 12D so as to support the detachable shelter frame 20D in front of the primary spectacle 10D.

More specifically, the third supporting member 313D defines a top engaging arm 3141D, a bottom supporting wall 3142D, and a side mounting wall 3143D integrally extending between the top engaging arm 3141D and the bottom supporting wall 3142D to form the C-shape cross section. In order to facilitate secure engagement between the primary bridge 12D and the shelter frame 20D, a cross sectional shape (surface curvature) of the primary bridge 12D is corresponding to a cross sectional shape (surface curvature) of the attaching groove 3144D so that the third supporting member 313D is capable of fittedly engaging with the primary bridge 12D for securely mounting the detachable shelter frame 20D on the primary spectacle 10D.

According to the fourth preferred embodiment of the present invention, the third supporting member 313D is made of elastic materials which is capable of being slightly deformed upon pressing against the primary bridge 12D. As a result, the primary bridge 10D is adapted to be pressed into attaching groove 3144D by slightly stretching the top engaging arm 3141D and the bottom supporting wall 3142D and when the pressing force is released, the elastic nature of the third supporting member 313D allows it to return to its original shape so as to fittedly engage with the primary bridge 12D.

Figure 16:
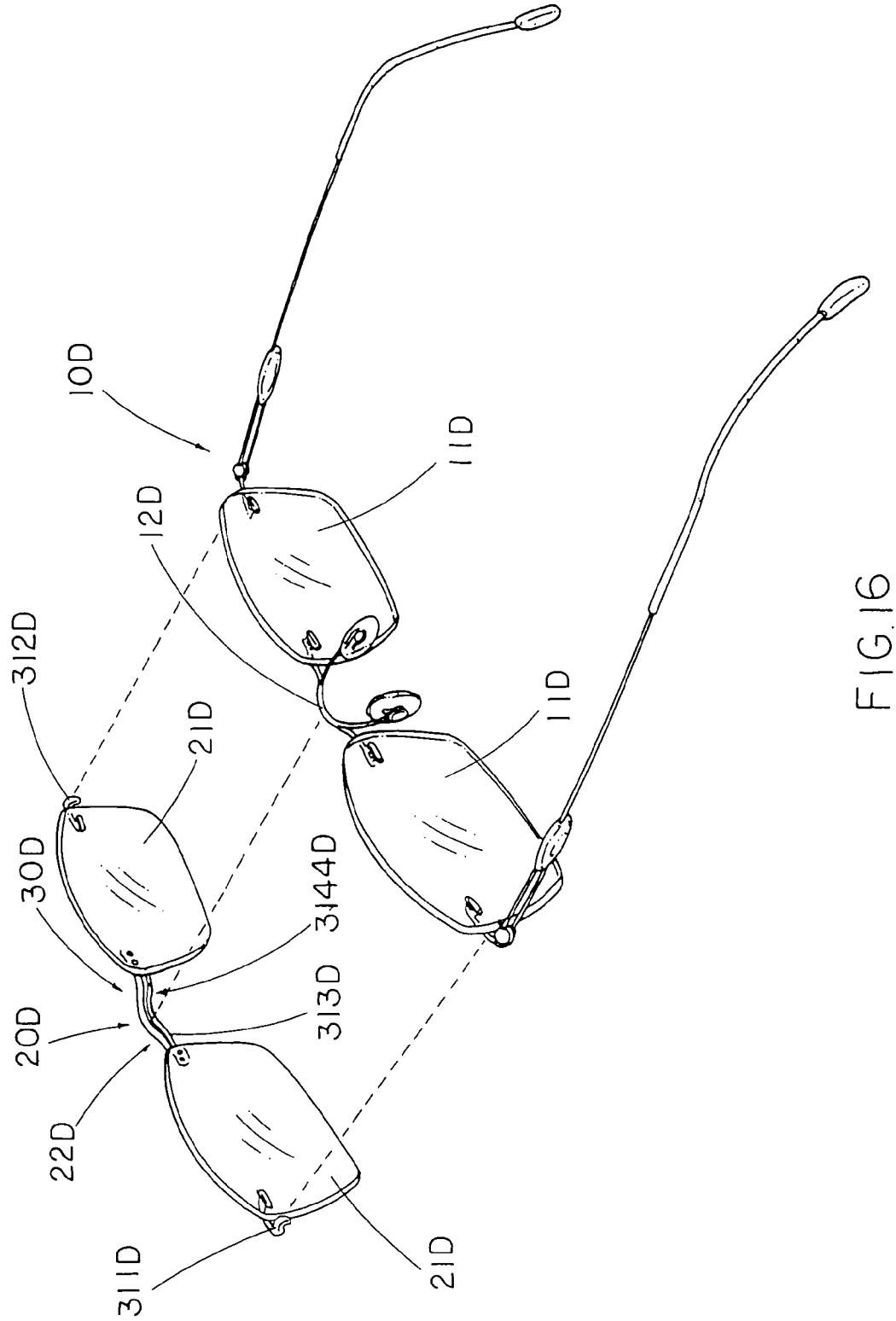
FIG. 16 is a perspective view of the spectacle set according to the above fourth preferred embodiment of the present invention, illustrating that the first and the second supporting members are extended from two outer sides of the shelter lenses.

It is worth mentioning that the first and the second supporting member 311D, 312D may be rearwardly extended from two outer sides of the shelter lenses 21D to ride on the side extensions of the primary spectacle 10D, as shown in FIG. 16 of the drawings.

Figure 17:
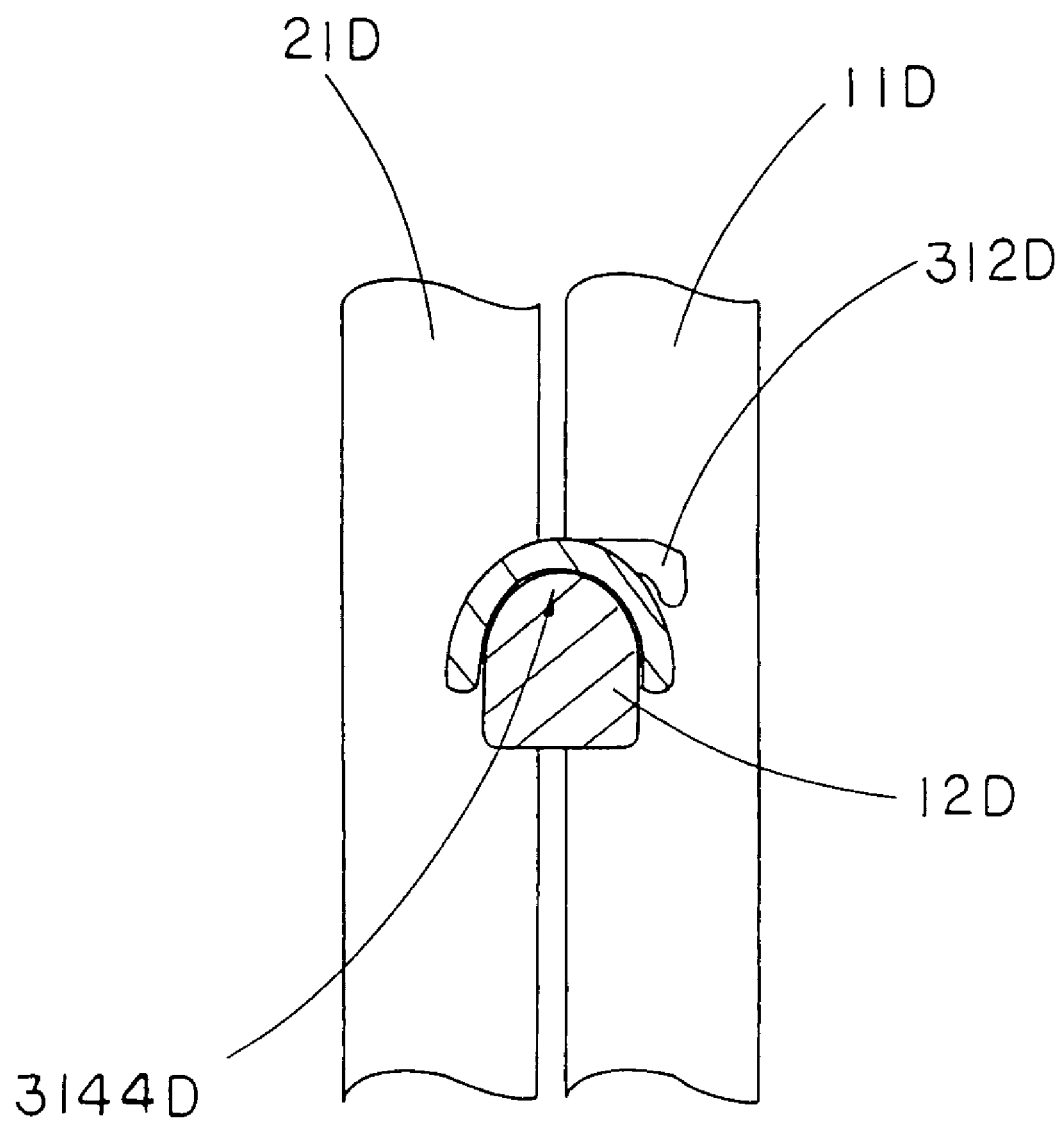
FIG. 17 is a first alternative mode of the spectacle set according to the above fourth preferred embodiment of the present invention.

Referring to FIG. 17 of the drawings, a first alternative mode of the spectacle set according to the fourth preferred embodiment of the present invention is illustrated. The second alternative mode is similar to the fourth preferred embodiment except the C-shaped attaching groove 3144D.

According to the first alternative mode, the third supporting member 313D is integrally formed at a bottom side of the shelter bridge 22D to form an attaching groove 3144D having a C-shaped cross section at the shelter bridge 22D for securely engaging with a mid-portion of a top side of the primary bridge 12D so as to retain the detachable shelter frame 20D in position, wherein the first and second supporting members 311D, 312D are rearwardly and spacedly extended from an upper portion of two end portions of the shelter bridge 22D respectively to substantially rest on the primary bridge 12D so as to support the detachable shelter frame 20D in front of the primary spectacle 10D.

From the forgoing descriptions, it can be shown that the above-mentioned objects have been substantially achieved. The present invention provides a spectacle set, wherein a mounting arrangement 30 of a detachable shelter frame 20 is arranged to apply an urging force to securely mount the detachable shelter frame 20 in front of a primary spectacle 10 in a detachably attaching manner so as to enhance the mounting operation of the detachable shelter frame 20.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spectacle set, comprising a primary spectacle and a detachable shelter frame adapted for detachably mounting in front of said primary spectacle, wherein:

said primary spectacle comprises two lenses, a non-magnetic primary bridge extended between two inner sides of said lenses respectively, and two side extensions provided at two outer sides of said lenses for coupling a pair of temples respectively; and said detachable shelter frame comprises two shelter lenses, a shelter bridge extended between two inner sides of said shelter lenses, and a mounting arrangement comprising first through third supporting members spacedly provided on said detachable shelter frame to mount on said primary spectacle for providing at least a three-point support of said shelter frame on said primary spectacle, wherein at least one of said supporting members is extended from said shelter bridge to engage with said primary bridge for supporting said shelter frame on said primary spectacle in a balanced manner, wherein said detachably shelter frame is stably mounted in front of said primary spectacle via said three-point support in a non-magnetically engaging manner, wherein said first and second supporting members are rearwardly and spacedly extended from an upper portion of said shelter bridge while said third supporting member is rearwardly extended from a lower portion of said shelter bridge at a position between said first and second supporting members, wherein said first and second supporting members are substantially rest on said primary bridge to support said detachable shelter frame in front of said primary spectacle while said third supporting member is engaged with a bottom side of said primary bridge to retain said detachable shelter frame in position so as to securely mount said detachable shelter frame in front of said primary spectacle frame with said three-point support.

2. The spectacle set, as recited in claim 1, wherein said mounting arrangement further comprises a retention arm integrally and upwardly protruded from said third supporting member for applying an urging force against said bottom side of said primary bridge when said detachable shelter frame is mounted in front of said primary spectacle to substantially retain said detachable shelter frame in said balance manner so as to maintain said spectacle frame in position with respect to said primary spectacle.

3. The spectacle set, as recited in claim 2, wherein a length of each of said first and second supporting members is longer than a length of said third supporting member for being substantially supported on said primary bridge.

4. The spectacle set, as recited in claim 3, wherein said supporting members are made of elastic materials for facilitating easy and convenient engagement between said detachable shelter frame and said primary bridge.

5. The spectacle set, as recited in claim 1, wherein a length of each of said first and second supporting members is longer than a length of said third supporting member for being substantially supported on said primary bridge.

6. The spectacle set, as recited in claim 1, wherein said supporting members are made of elastic materials for facilitating easy and convenient engagement between said detachable shelter frame and said primary bridge.

7. A spectacle set, comprising a primary spectacle and a detachable shelter frame adapted for detachably mounting in front of said primary spectacle, wherein:

said primary spectacle comprises two lenses, a non-magnetic primary bridge extended between two inner sides of said lenses respectively, and two side extensions provided at two outer sides of said lenses for coupling a pair of temples respectively; and said detachable shelter frame comprises two shelter lenses, a shelter bridge extended between two inner sides of said shelter lenses, and a mounting arrangement comprising first through third supporting members spacedly provided on said detachable shelter frame to mount on said primary spectacle for providing at least a three-point support of said shelter frame on said primary spectacle, wherein at least one of said supporting members is extended from said shelter bridge to engage with said primary bridge for supporting said shelter frame on said primary spectacle in a balanced manner, wherein said detachably shelter frame is stably mounted in front of said primary spectacle via said three-point support in a non-magnetically engaging manner, wherein said third supporting member is rearwardly extended from an upper portion of said shelter bridge while said first and second supporting members are rearwardly and spacedly extended from a lower portion of said shelter bridge that said third supporting member is positioned between said first and second supporting members, wherein said third supporting member is substantially rest on said primary bridge to support said detachable shelter frame in front of said primary spectacle while said first and second supporting members are engaged with a bottom side of said primary bridge to retain said detachable shelter frame in position so as to securely mount said detachable shelter frame in front of said primary spectacle frame with said three-point support.

8. The spectacle set, as recited in claim 7, wherein said mounting arrangement further comprises two retention arms integrally and upwardly protruded from said first and second supporting members respectively for applying an urging force against said bottom side of said primary bridge when said detachable shelter frame is mounted in front of said primary spectacle to substantially retain said detachable shelter frame in said balance manner so as to maintain said spectacle frame in position with respect to said primary spectacle.

9. The spectacle set, as recited in claim 8, wherein a length of said third supporting member is longer than a length of each of said first and second supporting members for being substantially supported on said primary bridge.

10. The spectacle set, as recited in claim 9, wherein said supporting members are made of elastic materials for facilitating easy and convenient engagement between said detachable shelter frame and said primary bridge.

11. The spectacle set, as recited in claim 7, wherein a length of said third supporting member is longer than a length of each of said first and second supporting members for being substantially supported on said primary bridge.

12. The spectacle set, as recited in claim 7, wherein said supporting members are made of elastic materials for facilitating easy and convenient engagement between said detachable shelter frame and said primary bridge.

* * * * *